J. E. KELLY.
Cattle Manger.
No. 27,812.
Patented April 10, 1860.
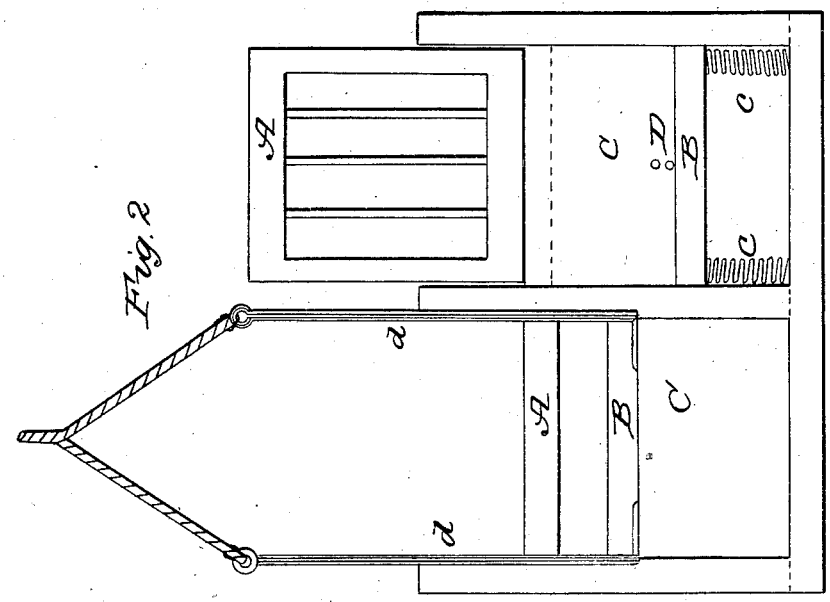
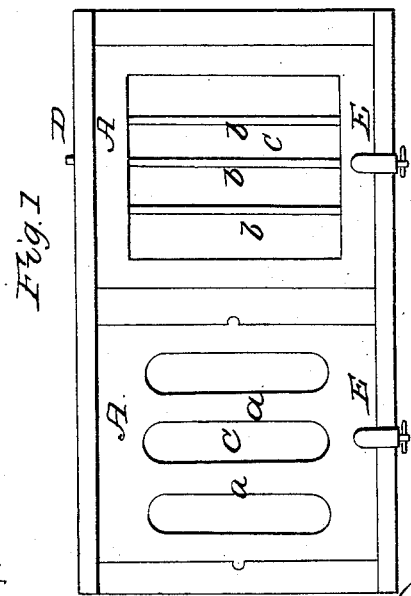

UNITED STATES PATENT OFFICE.

JOHN E. KELLY, OF NEW YORK, N. Y.

MANGER.

Specification of Letters Patent No. 27,812, dated April 10, 1860.

*To all whom it may concern:*

Be it known that I, JOHN E. KELLY, of the city and county of New York, in the State of New York, have invented new and useful Improvements in Mangers and Boxes for the Saving of Feed for Animals, and the following is a clear and exact description of the same, reference being had to the accompanying drawings, making a part of this specification.

The nature of my invention consists in the construction of a box or manger to feed animals in having a movable bottom, which is supported on springs or rods, and can be depressed to receive any given quantity of feed, and is raised and kept up to the rack or bars by the springs, or by weights as the feed is consumed, and thereby is prevented from being drawn out and wasted, or being mumbled over, which renders it unwholesome.

To enable others skilled in the art to make and use my invention, I will describe it referring to the drawings, and the letters of reference marked thereon.

Figure 1, represents a top plan of two sections. Fig. 2, shows an open side elevation with one of racks opened.

The manner of constructing my improved manger, for stables, or stalls, where a number of animals are to be fed, is to have a parallel box extending the required distance, this being subdivided into separate compartments ($c$,) for each mess, over the top of which is hinged a frame (A) having slots ($a$, $a$,) or iron rods or bars ($b$, $b$,) which form a rack and is raised up and opened to receive the hay or any kind of feed.

The bottom (B,) is made of plank and is nearly fitted to the size of the compartment ($c$,) where it can easily move up and down, can be depressed and held by the sliding bolt (D,) or a catch, while the feed is being placed, and inclosed therein by shutting down the frame (A,) and securing it by the fastening (E,).

As the contents are being consumed from the openings in the racks, they are brought up and kept to press against the slats ($a$,) or bars ($b$, $b$,) by the springs ($c$, $c$,) underneath or by a weight attached to a cord, and fastened to the upright rods ($d$, $d$,) passing over a pulley.

For feeding animals out of doors or in the field, I construct my improved feed box, or trough in the manner as above described, in single sections; or of any length required. They may be made stationary or portable, and can be easily moved to change the locality when desired.

It is a well known fact to all cattle and stock raisers, that by the ordinary arrangement of mangers, and the manner in which feed is placed before animals, especially when fed in herds, out of doors, much of the feed is wasted by being drawn out and trampled under foot, and when they have unlimited access to all the mess at first, they will pick for the finest qaulities, and thus by mumbling it over, much of it is rendered unwholesome. It will readily be seen that by my invention, all of the above named difficulties will be entirely remedied, and the arrangement is so simple in its construction, and efficient in its operation, that any further description may be deemed unnecessary.

Having thus fully described my improved mode for saving feed for animals, what I claim as new, and desire to secure by Letters Patent, is—

The movable bottom to mangers and feed boxes; supported in such manner that they may be depressed to receive the given quantity of feed, and are raised and kept up to the rack or bars by means of springs or weights, or their equivalents in combination with a feeding rack, made horizontal, or nearly so in the manner described, and for the purposes specified.

JOHN E. KELLY.

Witnesses:
 EDM. F. BROWN,
 J. B. WOODRUFF.